United States Patent
Patil et al.

(10) Patent No.: US 9,771,466 B2
(45) Date of Patent: Sep. 26, 2017

(54) GLYCOL ETHER-BASED CYCLOHEXANOATE ESTER PLASTICIZERS AND BLENDS THEREFROM

(71) Applicant: ExxonMobil Chemical Patents Inc., Baytown, TX (US)

(72) Inventors: Abhimanyu O. Patil, Westfield, NJ (US); Satish Bodige, Wayne, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 36 days.

(21) Appl. No.: 14/527,480

(22) Filed: Oct. 29, 2014

(65) Prior Publication Data

US 2015/0112008 A1   Apr. 23, 2015

Related U.S. Application Data (63) Continuation-in-part of application No. 13/316,745, filed on Dec. 12, 2011, now Pat. No. 9,228,147.

(60) Provisional application No. 61/422,886, filed on Dec. 14, 2010.

(51) Int. Cl.
  *C08K 5/12* (2006.01)
  *C08K 5/10* (2006.01)
  *C10M 105/36* (2006.01)
  *C10M 129/72* (2006.01)
  *C08K 5/00* (2006.01)

(52) U.S. Cl.
  CPC .............. *C08K 5/12* (2013.01); *C08K 5/0016* (2013.01); *C08K 5/10* (2013.01); *C10M 105/36* (2013.01); *C10M 129/72* (2013.01); C10M 2207/282 (2013.01); C10M 2207/2825 (2013.01); C10M 2209/109 (2013.01); C10M 2209/1095 (2013.01); C10N 2230/02 (2013.01); C10N 2230/06 (2013.01)

(58) Field of Classification Search
  CPC .......... C08K 5/0016; C08K 5/10; C08K 5/12; C10M 105/36; C10M 129/72; C10M 2207/282; C10M 2207/2825; C10M 2209/109; C10M 2209/1095; C10N 2230/02; C10N 2230/06
  See application file for complete search history.

(56) References Cited

U.S. PATENT DOCUMENTS

| | | | |
|---|---|---|---|
| 2,520,084 A * | 8/1950 | Joachim | C08K 5/101 524/289 |
| 2,634,248 A | 4/1953 | Dazzi | |
| 2,898,319 A * | 8/1959 | Petropoulos | C08K 5/12 524/293 |
| 3,440,409 A * | 4/1969 | Kaminsky | G06F 3/08 235/458 |
| 3,928,481 A | 12/1975 | Suggitt | |
| 3,928,484 A | 12/1975 | Suggitt | |
| 3,962,362 A | 6/1976 | Suggitt | |
| 4,764,294 A | 8/1988 | Habeeb et al. | |
| 5,138,022 A | 8/1992 | Mang et al. | |
| 5,188,815 A | 2/1993 | Coates | |
| 5,352,374 A | 10/1994 | Habeeb et al. | |
| 5,370,809 A | 12/1994 | Ishida et al. | |
| 5,512,189 A | 4/1996 | Wu et al. | |
| 5,531,911 A | 7/1996 | Adams et al. | |
| 5,631,212 A | 5/1997 | Vrahopoulou | |
| 6,165,949 A | 12/2000 | Berlowitz et al. | |
| 6,239,298 B1 | 5/2001 | Williamson et al. | |
| 6,355,186 B1 | 3/2002 | Shimomura et al. | |
| 6,740,254 B2 | 5/2004 | Zhou et al. | |
| 6,777,514 B2 | 8/2004 | Patil et al. | |
| 6,824,671 B2 | 11/2004 | Goze et al. | |
| 7,297,738 B2 | 11/2007 | Gosse et al. | |
| 7,579,511 B1 | 8/2009 | Dakka et al. | |
| 7,754,663 B2 | 7/2010 | Habeeb et al. | |
| 8,476,350 B2 | 7/2013 | Dakka et al. | |
| 8,829,093 B2 | 9/2014 | Dakka et al. | |
| 2003/0130142 A1 | 7/2003 | Nguyen | |
| 2004/0116643 A1 | 6/2004 | Kurihashi et al. | |
| 2005/0038283 A1 | 2/2005 | Kawahara et al. | |
| 2006/0183832 A1 | 8/2006 | Tsuchihashi et al. | |
| 2006/0247461 A1 | 11/2006 | Schlosberg et al. | |
| 2008/0242895 A1 | 10/2008 | Godwin et al. | |
| 2009/0062454 A1 * | 3/2009 | Hardouin-Duparc | ... C08L 27/06 524/569 |
| 2009/0281349 A1 | 11/2009 | Shieh et al. | |
| 2010/0159177 A1 | 6/2010 | Dakka et al. | |
| 2011/0021680 A1 | 1/2011 | Colle et al. | |
| 2012/0108874 A1 | 5/2012 | Gralla et al. | |
| 2012/0149620 A1 | 6/2012 | Patil et al. | |
| 2013/0225737 A1 | 8/2013 | Gosse et al. | |
| 2014/0212666 A1 | 7/2014 | Dakka et al. | |
| 2014/0228494 A1 | 8/2014 | Colle et al. | |
| 2014/0275605 A1 | 9/2014 | Dakka et al. | |
| 2014/0275607 A1 | 9/2014 | Dakka et al. | |
| 2014/0275609 A1 | 9/2014 | Dakka et al. | |
| 2014/0315021 A1 | 10/2014 | Naert et al. | |
| 2014/0316155 A1 | 10/2014 | Dakka et al. | |
| 2015/0080545 A1 | 3/2015 | Dakka et al. | |
| 2015/0080546 A1 | 3/2015 | Dakka et al. | |

FOREIGN PATENT DOCUMENTS

| | | |
|---|---|---|
| JP | S51-070396 | 6/1976 |
| JP | S52-121596 | 10/1977 |

(Continued)

OTHER PUBLICATIONS

U.S. Appl. No. 13/316,745, filed Dec. 12, 2011, Patil et al.

(Continued)

*Primary Examiner* — Paul A Zucker
*Assistant Examiner* — Mark Luderer (57) ABSTRACT

Plasticizers of glycol ether-based cyclohexanoate esters and blends thereof with thermoplastic polymers, such as PVC, are disclosed.

14 Claims, 2 Drawing Sheets

(56) References Cited

FOREIGN PATENT DOCUMENTS

| JP | S60-181142 | 9/1985 | |
|---|---|---|---|
| JP | 1999-302445 | 11/1999 | |
| JP | 2003-268154 | 9/2003 | |
| JP | 2008-127342 | 6/2008 | |
| JP | 2008-1466047 | 6/2008 | |
| JP | 2009-035497 | 2/2009 | |
| JP | 2009-035498 | 2/2009 | |
| JP | 2009-057350 | 3/2009 | |
| WO | WO 92/13933 | 8/1992 | |
| WO | WO 99/32427 | 7/1999 | |
| WO | WO 00/19972 | 4/2000 | |
| WO | WO 03/029339 | 4/2003 | |
| WO | WO 2004/046078 | 6/2004 | |
| WO | WO2009085453 | * | 7/2009 |
| WO | WO 2012/082826 | 6/2012 | |

OTHER PUBLICATIONS

U.S. Appl. No. 61/422,886, filed Dec. 14, 2010, Patil et al.
Boone et al., "*Transition Metal Catalyzed Polymerizations of Vinyl Chloride: Past and Present*," Polymer Preprints 2001, 42(2), pp. 830-831.
Braun et al., "*PVC—Origin, Growth, and Future*," Polymer Preprints 2001, 42(2), p. 826.
Clary et al., "*A Green, One-Pat Route to the Biphenylclicarboxylie Acids: Useful Intermediates in Polymer Synthesis*," International Journal of Organic Chemistry, Jun. 2013, vol. 3, No. 2, pp. 143-147.
Godwin, A. D., "*Plasticizers*," Applied Polymer Science 21$^{st}$ Century, C. D. Craver and C. E. Carraher eds., Elsevier (2000), pp. 157-175.
Ivan, B., "*A Critical Overview of PVC Stabilization Mechanisms in the Light of Recent Experimental Results*," Polymer Preprints 2001, 42(2), p. 872-873.
Kulev, et al., "*Esters of Diphenie Acid and their Plasticizing Properties*", Izvestiya Tontskogo Politekhnicheskogo Instituta. 1961, 111. (English abstract only).
Shioda, et al., "*Synthesis of dialkyl diphenates and their properties*", Yuki Gosei Kagaku Kyokaishi, 1959, 17. (English abstract only).
U.S. Appl. No. 62/012,037, filed Jun. 13, 2014, Dakka et al.
U.S. Appl. No. 62/026,889, filed Jul. 21, 2014, Dakka et al.
U.S. Appl. No. 62/068,144, filed Oct. 24, 2014, Dakka et al.
U.S. Appl. No. 62/320,014, filed Apr. 8, 2016, Dakka et al.
U.S. Appl. No. 14/516,239, filed Oct. 16, 2014, Dakka et al.
Brenda et al., "Novel Palladium-Catalyzed Biaryl Synthesis with Haloarenes," Synlett, 1991, 11, pp. 809-810.
Dikusar et al., "Preparative Synthesis of Functionally Substituted Esters of Dehydroabietic and 4,4'-Biphenyldicarboxylic Acids," Russian Journal of General Chemistry, vol. 74, No. 8, 2004, pp. 1259-1263.
Inoue et al., "Simple and Efficient TiCl4-Mediated Synthesis of Biaryls via Arylmagnesium Compounds," Tetrahedron, 2000, 56, pp. 9601-9605.
Shen et al., "SCF Solubility of Aromatic-based Monomers, Dimers and Polymers," Polymer Preprints, ACS Division of Polymer Chemistry, 2004, 45 (1), pp. 518-519.

* cited by examiner

GLYCOL ETHER-BASED CYCLOHEXANOATE ESTER PLASTICIZERS AND BLENDS THEREFROM

PRIORITY AND CROSS-REFERENCE TO RELATED APPLICATIONS

This application is a continuation-in-part of U.S. Ser. No. 13/316,745, filed Dec. 12, 2011 which claims the benefit of and priority to U.S. Provisional Application Ser. No. 61/422,886, filed Dec. 14, 2010, herein incorporated by reference in their entirety.

FIELD

This disclosure relates plasticizers of glycol ether-based cyclohexanoate esters and blends thereof.

BACKGROUND

Plasticizers are incorporated into a resin (usually a plastic or elastomer) to increase the flexibility, workability, or distensibility of the resin. The largest use of plasticizers is in the production of "plasticized" or flexible polyvinyl chloride (PVC) products. Typical uses of plasticized PVC include films, sheets, tubing, coated fabrics, wire and cable insulation and jacketing, toys, flooring materials such as vinyl sheet flooring or vinyl floor tiles, adhesives, sealants, inks, and medical products such as blood bags and tubing, and the like.

Other polymer systems that use small amounts of plasticizers include polyvinyl butyral, acrylic polymers, nylon, polyolefins, polyurethanes, and fluoroplastics. Plasticizers can also be used with rubber (although often these materials fall under the definition of extenders for rubber rather than plasticizers). A listing of the major plasticizers and their compatibilities with different polymer systems is provided in "Plasticizers," A. D. Godwin, in Applied Polymer Science 21st Century, edited by C. D. Craver and C. E. Carraher, Elsevier (2000); pp. 157-175.

In the late 1990's and early 2000's, various compositions based on cyclohexanoate, cyclohexanedioates, and cyclohexanepolyoate esters were said to be useful for a range of goods from semi-rigid to highly flexible materials. See, for instance, WO 99/32427, WO 2004/046078, WO 2003/029339, US Patent Application No. 2006/0247461, and U.S. Pat. No. 7,297,738.

US Patent Application No. 2006/0183832 discloses a plasticizer for amorphous polyester resin which can give softness without hindering the transparency of the amorphous polyester resin, and an amorphous polyester resin composition superior in softness, transparency and heat resistance. A plasticizer for amorphous polyester resin, which is made of an ester of an (Aa) component selected from hydroxy aromatic carboxylic acid (AI), hydroxy condensed polycyclic aromatic carboxylic acid, hydroxy alicyclic carboxylic acid and others, and an (Ab) component selected from aliphatic alcohol, alicyclic alcohol, aromatic alcohol, phenol, alkylphenol, or alkylene oxide added products thereof.

Other references of interest include: U.S. Pat. Nos. 6,239,298; 6,355,186; 6,740,254; US 2011-0021680; US patent application No. 2014-0228494; U.S. Pat. No. 6,777,514; US patent application No. 2005/038283; US patent application No. 2008/0242895; U.S. Pat. Nos. 8,476,350; 2,520,084; Japanese Patent Application No. 51-070396; Japanese Patent Application No. 52-121596; Japanese Patent Application No. 60-181142; Japanese Patent Application No. 2008-H66047; U.S. Pat. No. 5,370,809; US patent application No. 2012/0108874; U.S. Pat. No. 5,138,022; "Esters of diphenic acid and their plasticizing properties", Kulev et al., *Izvestiya Tomskogo Politekhnicheskogo Instituta* (1961) 111; "Synthesis of dialkyl diphenates and their properties", Shioda et al., *Yuki Gosei Kagaku Kyokaishi* (1959), 17; and Clary, International Journal of Organic Chemistry, 2013, 3, 143-147.

There is increased interest in developing new plasticizers that offer good plasticizer performance characteristics (such as melting or chemical and thermal stability, pour point, glass transition, increased compatibility, good performance and/or low temperature properties) and are competitive economically. The present disclosure is directed towards plasticizers that can be made from low cost feeds and employ fewer manufacturing steps in order to meet economic and performance targets.

SUMMARY

This invention relates to a composition comprising a thermoplastic polymer and a compound of the formula:

wherein each $R_1$ is, independently, $C_1$ to $C_{12}$ linear or branched alkyl; each $R_2$ is, independently, H or $CH_3$; each n is, independently, 1, 2, 3 or 4, and when n=4, $R_1$ is $C_2$ to $C_{12}$ linear or branched alkyl.

This invention also relates to a composition comprising:
1) a thermoplastic polymer,
2) at least one glycol ether-based cyclohexanoate ester, preferably represented by the formula:

wherein each $R_1$ is, independently, $C_1$ to $C_{12}$ linear or branched alkyl; each $R_2$ is, independently, H or $CH_3$; each n is, independently, 1, 2, 3 or 4, and when n=4, $R_1$ is $C_2$ to $C_{12}$ linear or branched alkyl; and
3) optionally, one or more second plasticizers comprising one or more of alkyl terephthalate, alkyl phthalate, alkyl benzoate ester, di-benzoate ester, ester of cyclohexane polycarboxylic acid, dialkyl adipate, or compound(s) represented by the formula:

wherein R*₁ is a saturated or unsaturated cyclic hydrocarbon optionally substituted with an alkyl and/or an OXO-ester, and R*₂ is a C₄ to C₁₄ hydrocarbyl, or mixtures thereof

DETAILED DESCRIPTION

All numerical values within the detailed description and the claims herein are modified by "about" or "approximately" the indicated value, and take into account experimental error and variations that would be expected by a person of ordinary skill in the art.

This invention relates to a composition comprising:

1) a thermoplastic polymer (such as polyvinyl chloride), and
2) at least one plasticizer compound of the formula:

wherein each $R_1$ is, independently, $C_1$ to $C_{12}$ linear or branched alkyl; each $R_2$ is, independently, H or $CH_3$; each n is, independently, 1, 2, 3 or 4, and when n=4, $R_1$ is $C_2$ to $C_{12}$ linear or branched alkyl; and

3) optionally, one or more second plasticizers selected from the group consisting of alkyl terephthalates, alkyl phthalates, alkyl benzoate esters, di-benzoate esters, esters of cyclohexane polycarboxylic acids, dialkyl adipates, or compound(s) represented by the formula:

wherein R*₁ is a saturated or unsaturated cyclic hydrocarbon (preferably a saturated or unsaturated C6 cyclic hydrocarbon) optionally substituted with an alkyl and/or an OXO-ester (preferably a C1 to C14 alkyl or OXO-ester), and R*₂ is a C₄ to C₁₄ hydrocarbyl.

Plasticizers (Glycol Ether-Based Cyclohexanoate Esters)

Useful plasticizers, such as glycol ether-based cyclohexanoate esters, include compounds represented by the formula:

wherein each $R_1$ is, independently, $C_1$ to $C_{12}$ linear or branched alkyl; each $R_2$ is, independently, H or $CH_3$; each n is, independently, 1, 2, 3 or 4, and when n=4, $R_1$ is $C_2$ to $C_{12}$ linear or branched alkyl.

An advantageous embodiment is directed to such compounds wherein $R_1$ is $C_2$ to $C_6$ alkyl.

Another advantageous embodiment is directed to such compounds wherein $R_1$ is $C_1$ to $C_6$ alkyl, $R_2$ is H, and n is 2 or 3.

In another advantageous embodiment, the compounds are configured such that $R_1$ is $C_1$ to $C_6$ alkyl, $R_2$ is $CH_3$, and n is 2 or 3; or wherein $R_1$ is $C_2$ to $C_{12}$ alkyl, $R_2$ is H, and n is 4.

The following structures represent useful specific novel compounds which fall within the above general formula:

di(ethylene glycol)monohexyl cyclohexane-1,2-dicarboxylate of the structure:

tri(ethylene glycol)monomethyl cyclohexane-1,2-dicarboxylate of the structure:

tri(propylene glycol)monomethyl cyclohexane-1,2-dicarboxylate of the structure:

tri(ethylene glycol)monoethyl cyclohexane-1,2-dicarboxylate of the structure:

tri(ethylene glycol)monobutyl cyclohexane-1,2-dicarboxylate of the structure:

di(ethylene glycol)monoethyl cyclohexane-1,2-dicarboxylate of the structure:

di(ethylene glycol)monobutyl cyclohexane-1,2-dicarboxylate of the structure:

tri(propylene glycol)monopropyl cyclohexane-1,2-dicarboxylate of the structure:

tri(propylene glycol)monobutyl cyclohexane-1,2-dicarboxylate of the structure:

and
poly(ethylene glycol)(4) dodecyl cyclohexane-1,2-dicarboxylate of the structure:

This disclosure is directed to blends comprising novel glycol ether-based cyclohexanoate ester fluids. New molecules were synthesized by the reaction of 1,2-cyclohexanedicarboxylic anhydride and glycol ethers. As an example, we have reacted 1,2-cyclohexanedicarboxylic anhydride with di(ethylene glycol)monohexyl ether to obtain a diester fluid represented by the following reaction mechanism:

The novel glycol ether-based cyclohexanote esters are organic molecules with precise structures (not oligomers or polymers).

In a preferred embodiment, the glycol ether-based cyclohexanote ester plasticizer is one of more of the following compounds (which can be synthesized according to procedures described in the Examples section of U.S. Ser. No. 13/316,745, filed Dec. 12, 2011):
di(ethylene glycol)monohexyl cyclohexane-1,2-dicarboxylate,
tri(ethylene glycol)monomethyl cyclohexane-1,2-dicarboxylate,
tri(propylene glycol)monomethyl cyclohexane-1,2-dicarboxylate,
tri(ethylene glycol)monoethyl cyclohexane-1,2-dicarboxylate,
tri(ethylene glycol)monobutyl cyclohexane-1,2-dicarboxylate, di(ethylene glycol)monoethyl cyclohexane-1,2-dicarboxylate,
di(ethylene glycol)monobutyl cyclohexane-1,2-dicarboxylate,
tri(propylene glycol)monopropyl cyclohexane-1,2-dicarboxylate,
tri(propylene glycol)monobutyl cyclohexane-1,2-dicarboxylate,
poly(ethylene glycol)(4) dodecyl cyclohexane-1,2-dicarboxylate,
ethylene glycol mono-2-ethylhexyl cyclohexane-1,2-dicarboxylate,
tetra(ethylene glycol) mono methyl cyclohexane-1,2-dicarboxylate,
di(ethylene glycol) hexadecyl cyclohexane-1,2-dicarboxylate,
di(ethylene glycol) octadecyl cyclohexane-1,2-dicarboxylate,
propylene glycol butyl cyclohexane-1,2-dicarboxylate, and
di(propylene glycol) methyl cyclohexane-1,2-dicarboxylate.

In a preferred embodiment of the invention, the glycol ether-based cyclohexanote ester plasticizer compound useful herein may be a mixture of two, three, four or more glycol ether-based cyclohexanote esters described herein at any ratio. In an embodiment of the invention, the first glycol ether-based cyclohexanote ester is present at 0.1 to 99.8 wt % (preferably 1 to 98 wt %, preferably 5 to 94.9 wt %, preferably 10 to 89.9 wt %), the second glycol ether-based cyclohexanote ester is present at 0.1 to 99.8 wt % (preferably 1 to 98 wt %, preferably 5 to 94.9 wt %, preferably 10 to 89.9 wt %), and each additional glycol ether-based cyclohexanote ester is present at least 0.1 wt %, preferably at least 1 wt %, preferably at least 5 wt %, preferably at least 10 wt %, based upon the weight of the glycol ether-based cyclohexanote ester compounds.

By changing the glycol ether portion, a series of molecules with varying polarity were synthesized.

Second Plasticizer

In a useful embodiment of the invention, a second plasticizer may also be present in the blend in addition to the glycol ether-based cyclohexanote ester(s).

Particularly useful second plasticizers include alkyl terephthalate, alkyl phthalate, alkyl benzoate ester, di-benzoate ester, ester of cyclohexane polycarboxylic acid, dialkyl adipate, or mixtures thereof, preferably the second plasticizers are selected from the group consisting of alkyl terephthalates, alkyl phthalates, alkyl benzoate esters, di-benzoate esters, esters of cyclohexane polycarboxylic acids, dialkyl adipates, and compounds of the formula:

wherein $R^*_1$ is a saturated or unsaturated cyclic hydrocarbon optionally substituted with an alkyl and/or an OXO-ester, and $R^*_2$ is a $C_4$ to $C_{14}$ hydrocarbyl or the hydrocarbon residue of a $C_4$ to $C_{14}$ OXO-alcohol, and mixtures thereof (such as one, two, three, four, five or more) second plasticizers.

Useful second plasticizers include compounds of the formula:

wherein $R^*_1$ is a saturated or unsaturated cyclic hydrocarbon optionally substituted with an alkyl and/or an OXO-ester, and $R^*_2$ is a $C_4$ to $C_{14}$ hydrocarbyl, preferably the second plasticizer is an alkylated biphenyl, such as dimethyl-biphenyl.

Useful second plasticizers may also comprise a mixture comprising at least two compounds of the formula:

wherein in the first compound, $R^*_1$ is a saturated cyclic hydrocarbon optionally substituted with an alkyl and/or an OXO-ester, and $R^*_2$ is a $C_4$ to $C_{14}$ hydrocarbyl, preferably a hydrocarbon residue of a $C_4$ to $C_{14}$ OXO-alcohol; and in the second compound $R^*_1$ is an unsaturated cyclic hydrocarbon optionally substituted with an alkyl and/or an OXO-ester, and $R^*_2$ is a $C_4$ to $C_{14}$ hydrocarbyl, preferably a hydrocarbon residue of a $C_4$ to $C_{14}$ OXO-alcohol.

These compounds can be produced according to the methods described in U.S. Ser. No. 13/751,835, filed Jan. 28, 2013; U.S. Ser. No. 14/164,889, filed Jan. 27, 2014; U.S. Ser. No. 14/201,173, filed Mar. 7, 2014; U.S. Ser. No. 14/201,226, filed Mar. 7, 2014; U.S. Ser. No. 14/201,287, filed Mar. 7, 2014; U.S. Ser. No. 14/201,224, filed Mar. 7, 2014; U.S. Ser. No. 14/201,284, filed Mar. 7, 2014.

Useful second plasticizers also include alkyl terephthalates (preferably $C_4$ to $C_{12}$ alkyl terephthalates) such as di-n-butyl terephthalate, diisobutyl terephthalate, di-n-octyl terephthalate, diisooctyl terephthalate, di-2-ethylhexyl terephthalate, di-n-nonyl terephthalate, diisononyl terephthalate, di-n-decyl terephthalate, di-2-propyl heptyl terephthalate, and diisodecyl terephthalate.

Useful second plasticizers also include the alkyl phthalates (preferably $C_4$ to $C_{40}$ alkyl, preferably $C_4$ to $C_{14}$ alkyl) and alkyl isophthalates (preferably $C_4$ to $C_{40}$ alkyl, preferably $C_4$ to $C_{14}$ alkyl) such as di-n-nonyl phthalate, diisononyl phthalate, di-n-decyl phthalate, diisodecyl phthalate, di-2-propyl heptyl phthalate, di-n-undecyl phthalate, ditridecyl phthalate, diisotridecyl phthalate, di-n-propyl isophthalate, di-n-nonyl isophthalate, diisononyl isophthalate, di-n-decyl isophthalate, diisodecyl isophthalate, di-2-propyl heptyl isophthalate, di-n-undecyl isophthalate, and diisotridecyl isophthalate.

Useful second plasticizers also include alkyl benzoate esters having from 7 to 13 carbon atoms in the alkyl moiety, preferably $C_9$ to $C_{13}$, preferably isononyl benzoate, nonyl benzoate, isodecyl benzoate, decyl benzoate, 2-propylheptyl benzoate, isoundecyl benzoate, and isotridecyl benzoate.

Useful second plasticizers also include esters of cyclohexane polycarboxylic acids (including alkyl 1,2-cyclohexanedicarboxylates, alkyl 1,3-cyclohexanedicarboxylates and alkyl 1,4-cyclohexanedicarboxylates) preferably having 4 to 13 carbons in the side chain, preferably 7 to 10 carbons in the side chain, preferably di-heptyl cyclohexanoate, di-2-ethylhexyl cyclohexanoate, di-n-nonyl cyclohexanoate, diisononyl cyclohexanoate, di-n-decyl cyclohexanoate, diisodecyl cyclohexanoate, and di-2-propyl heptyl cyclohexanoate.

Useful second plasticizers also include dialkyl adipates having 4 to 13 carbon atoms preferably having 7 to 10 carbons in the alkyl moiety, preferably diheptyl adipate, dioctyl adipate, diisononyl adipate, diisodecyl adipate, and di 2-propylheptyl adipate.

Useful second plasticizers also include dibenzoate esters (also referred to as dibenzoic esters of glycols), preferably dipropylene glycol dibenzoate, diethylene glycol dibenzoate, triethylene glycol dibenzoate and mixtures of dipropylene, diethylene and triethylene glycol dibenzoates.

Examples of commercially available benzenepolycarboxylic acid esters useful herein include phthalates such as: Palatinol™ AH (Di-(2-ethylhexyl) phthalate; Palatinol™ N (Diisononyl phthalate); Vestinol™ 9 (Diisonyl phthalate); Palatinol™ Z (Diisodecyl phthalate); Palatinol™ 10-P (Di-(2-Propylheptyl) phthalate); Palatinol™ 711P (Heptylundecyl phthalate); Palatinol™ 911 (Nonylundecyl phthalate); Palatinol™ 11P-E (Diundecyl phthalate); Palatinol™ 11P-E; Jayflex™ DINP; Jayflex™ DIDP; Jayflex™ DIUP; Jayflex™ DTDP; and Emoltene™ 100.

Examples of cyclohexane polycarboxylic acid esters useful herein include: Hexamoll DINCH™ (diisonyl cyclohexanoate); Elatur™ CH (diisonyl cyclohexanoate); Nan Ya™ DPEH (bis(2-ethyl hexyl)cyclohexanoate); and Nan Ya™ DPN (diisononyl cyclohexanoate).

Examples of commercially available adipates useful herein include: Plastomoll™ DOA (diisononyl adipate); Oxsoft™ DOA; Eastman™ DOA (di-(2-ethylhexyl) adipates); and Plastomoll™ DNA (diisononyl adipate).

Examples of commercially available alkyl benzoates useful herein include: Vestinol™ INB (isononyl benzoate); Jayflex™ MB10 (isodecyl benzoate); Benzoflex™ 131 (isodecyl benzoate); and Uniplex™ 131 (isodecyl benzoate).

Particularly useful examples of useful plasticizers include the commercially available terephthalates such as Eastman 168™; OXSOFT GPO™; and LGFLEX GL™ 300 (bis(2-ethylhexyl)terephthalate).

Particularly useful examples of useful plasticizers include the commercially available di-benzoate plasticizer mixtures such as: Benzoflex™ 988; Benzoflex™ 2088; Kflex™ 500; and Santicizer™ 9000 series.

Particularly useful second plasticizers include: dialkyl (ortho)phthalate, preferably having 4 to 13 carbon atoms in the alkyl chain; trialkyl trimellitates, preferably having 4 to 10 carbon atoms in the side chain; dialkyl adipates, having 4 to 13 carbon atoms; dialkyl terephthalates each preferably having 4 to 8 carbon atoms and more particularly 4 to 7 carbon atoms in the side chain; alkyl 1,2-cyclohexanedicarboxylates, alkyl 1,3-cyclohexanedicarboxylates and alkyl 1,4-cyclohexanedicarboxylates, and preferably alkyl 1,2-cyclohexanedicarboxylates each preferably having 4 to 13 carbon atoms in the side chain; dibenzoic esters of glycols; and alkyl benzoates, preferably having 7 to 13 carbon atoms in the alkyl chain.

Particularly useful second plasticizers include: dialkyl sebacates preferably having 4 to 13 carbon atoms; dialkyl azelates preferably having 4 to 13 carbon atoms; alkylsulfonic esters of phenol with preferably one alkyl radical containing 8 to 22 carbon atoms; polymeric plasticizers (based on polyester in particular), glyceryl esters, acetylated glycerol esters, epoxy estolide fatty acid alkyl esters, citric triesters such as tributylacetyl citrate having a free or carboxylated OH group and for example alkyl radicals of 4 to 9 carbon atoms; tri-2-ethylhexyl phosphate, trioctyl phosphate such as 2-ethylhexyl-isodecyl phosphate, di-2-ethylhexyl phenyl phosphate, triphenyl phosphate, tricresyl phosphate; high chlorine content chlorinated paraffins, alkylpyrrolidone derivatives having alkyl radicals of 4 to 18 carbon atoms and also polyester plasticizers, such as pentaerythritol ester of $C_5$ (valeric) to $C_9$ (pelargonic) acids. In all instances, the alkyl radicals can be linear or branched and the same or different.

Thermoplastic Polymers

Preferably, the thermoplastic polymer comprises one or more of vinyl chloride resins, polyesters, polyurethanes, ethylene-vinyl acetate copolymer, rubbers, poly(meth)acrylics and combinations thereof, alternately the polymer comprises one or more of polyvinyl chloride (PVC), polyvinylidene chloride, a copolymer of polyvinyl chloride and polyvinylidene chloride, and polyalkyl methacrylate (PAMA), preferably, the polymer is a copolymer of vinyl chloride with at least one monomer selected from the group consisting of vinylidene chloride, vinyl acetate, vinyl propionate, vinyl butyrate, vinyl benzoate, methyl acrylate, ethyl acrylate, and butyl acrylate.

In any embodiment of the invention, in the polymer composition comprising a thermoplastic polymer and glycol ether based-cyclohexanoate ester plasticizer, the total amount of the glycol ether based-cyclohexanoate ester plasticizer(s) is from 5 to 90 wt %, based upon the weight of the polymer and plasticizer(s), preferably from 10 to 85 wt %, even more preferably in the range from 15 to 80 wt %, preferably in the range from 20 to 75 wt %.

In any embodiment of the invention, in the polymer composition comprising a thermoplastic polymer and at least two plasticizers (at least one first plasticizer of glycol ether based-cyclohexanoate ester and at least one second plasticizer), the total amount of all plasticizers is from 5 to 90 wt %, based upon the weight of the polymer and plasticizer, preferably from 10 to 85 wt %, even more preferably in the range from 15 to 80 wt %, preferably in the range from 20 to 75 wt %.

In any embodiment, the mixture of first and second plasticizers comprises from 1 to 99 wt % (preferably from 5 to 90 wt %, preferably 10 to 80 wt %) of at least one first plasticizer of glycol ether based-cyclohexanoate ester(s) and from 99 to 1 wt % (preferably from 95 to 10 wt %, preferably 90 to 20 wt %) of at least one second plasticizer, based upon the weight of the plasticizers.

Typical formulations including the blend of the present invention could be, in parts by weight:
  a) Thermoplastic polymer (such as PVC or PVC copolymer) 100 phr (parts per hundreds of polymer);
  b) First Plasticizer of glycol ether based-cyclohexanoate ester(s) (25-85 phr, alternately 30-70 phr, alternately 35-65phr);
  c) optional, Second Plasticizer(s) (5-55 phr, alternately 5-45 phr, alternately 10-35 phr);
  d) Filler (0-150 phr, alternately 2-100 phr, alternately 3-80 phr); and
  e) Stabilizer (1-10 phr, alternately 2-8 phr, alternately 4-6 phr).

Alternatively, typical formulations for use in the production of automotive underbody sealants which typically have high plasticizer and high filler could be, in parts by weight:
  a) Thermoplastic polymer (such as PVC and/or PVC copolymer) 100 phr (preferably combinations of PVC and PVC copolymer);
  b) First Plasticizer of glycol ether based-cyclohexanoate ester(s) (50-100 phr, alternately 60-90 phr, alternately 65-85 phr);

c) Second Plasticizer(s) (15-45 phr, alternately 20-40 phr, alternately 25-35 phr);
d) Filler, such as calcium carbonate, (60-200 phr alternately 70-150 phr, alternately 80-120 phr); and
e) Stabilizer and other additives (0-10 phr, alternately 2-8 phr, alternately 3-6 phr).

As a further embodiment formulations for the production of calendered floor tiles could be, in parts by weight:
a) Thermoplastic polymer (such as PVC and/or PVC copolymer) 100 phr (preferably combinations of PVC and PVC copolymer);
b) First Plasticizer of glycol ether based-cyclohexanoate ester(s) (20-60 phr, alternately 25-55 phr, alternately 35-45 phr);
c) Second Plasticizer(s) (5-50 phr, alternately 10-35 phr, alternately 15-30 phr);
d) Epoxidized soybean oil (0-6 phr, alternately 1-5 phr, alternately 2-4 phr);
e) Filler, such as $CaCO_3$, (200 to 800 phr, alternately 400-700 phr, alternately 500-600 phr);
and
f) Pigments, stabilizers, other additives (0-10 phr).

As a further embodiment, formulations for the production of wire and cable (insulation, filling compound, sheathing, etc.) could be, in parts by weight:
a) Thermoplastic polymer (such as PVC and/or PVC copolymer) 100 phr (preferably combinations of S-PVC and PVC copolymer);
b) First Plasticizer of glycol ether based-cyclohexanoate ester(s) (35-95 phr, alternately 30-80 phr, alternately 40-70 phr);
c) Second Plasticizer(s) (5-35 phr, alternately 5-30 phr, alternately 10-25 phr);
d) Filler, such as $CaCO_3$, (60 to 600 phr, alternately 70-500 phr, alternately 80-150 phr);
and
e) Stabilizers, other additives (0-20 phr, alternately 5-15 phr, alternately 5-10 phr).

The present invention, therefore, further provides the use of from 20 to 120 phr (parts per 100 parts of thermoplastic polymer, such as polyvinyl chloride), from 30 to 90, more preferably from 40 to 80, more preferably from 50 to 70 phr of a plasticizer composition comprising glycol ether based-cyclohexanoate ester(s) to improve the processability of a thermoplastic polymer (such as polyvinyl chloride) formulation, especially in cold temperature flexibility and plasticizer weight loss (volatility). In a further embodiment, the present invention provides a plasticized polyvinyl chloride composition for use in pelletizing, extrusion, injection molding or calendering.

In a further embodiment, this invention provides extruded or injection molded articles obtained from a plasticized thermoplastic polymer, such as polyvinyl chloride, composition containing from 20 to 100, preferably from 30 to 90, more preferably from 40 to 80, more preferably from 50 to 70 parts by weight of the plasticizer(s) of the present invention.

We have also found that the plasticizers of the present invention are particularly useful in the transformation of plasticized polyvinyl chloride compositions including, for example, pelletizing, extrusion, injection molding and calendering. Calendering is used in applications such as the production of roofing, protective films including stationery. Extrusion is used in the production of films, pipes, guttering and wire and cable coatings. Injection molding is used in the production of shoes, toys and the like.

The polymer composition comprising a thermoplastic polymer and glycol ether based-cyclohexanoate ester(s) plasticizers described herein may further contain additives to optimize the chemical, mechanical or processing properties, said additives being more particularly selected from the group consisting of fillers, clays, nanoparticles, fibers, such as calcium carbonate, titanium dioxide or silica, carbon fibers, clays, pigments, thermal stabilizers, antioxidants, UV stabilizers, lubricating or slip agents, flame retardants, antistatic agents, biocides, impact modifiers, blowing agents, (polymeric) processing aids, viscosity depressants or regulators such as thickener and thinners, antifogging agents, optical brighteners, etc.

Thermal stabilizers useful herein include all customary polymer stabilizers, especially PVC stabilizers in solid or liquid form, examples are those based on Ca/Zn, Ba/Zn, Pb, Sn or on organic compounds (Organic Based Stabilizers), and also acid-binding phyllosilicates such as hydrotalcite. The mixtures to be used according to the present invention may have a thermal stabilizer content of 0.5 to 10, preferably 0.8 to 5 and more preferably 1.0 to 4 wt %, based upon the weight of the polymer composition.

It is likewise possible to use costabilizers with plasticizing effect in the polymer composition comprising a thermoplastic polymer and at least one plasticizer as described herein, in particular epoxidized vegetable oils, such as epoxidized linseed oil or epoxidized soya oil.

Antioxidants are also useful in the polymer composition comprising a thermoplastic polymer and at least two plasticizers (at least one first plasticizer and at least one second plasticizer) as described herein and can include sterically hindered amines—known as HALS stabilizers, sterically hindered phenols, such as Topanol™ CA, phosphites, UV absorbers, e.g. hydroxybenzophenones, hydroxyphenylbenzotriazoles and/or aromatic amines. Suitable antioxidants for use in the compositions of the present invention are also described for example in "Handbook of Vinyl Formulating" (editor: R. F. Grossman; J. Wiley & Sons; New Jersey (US) 2008). The level of antioxidants in the mixtures of the present invention is typically not more than 10 phr, preferably not more than 8 phr, more preferably not more than 6 phr and even more preferably between 0.01 and 5 phr (phr=parts per hundred parts of polymer). The antioxidant can also be mixed with the plasticizer for better dispersion and stabilizing efficiency. The level of antioxidants in the plasticizer blends of the present invention is typically not more than 0.5 wt % of the total plasticizer weight, more preferably not more than 0.3 wt %, more preferably between 0.1 and 0.3 wt %.

Organic and inorganic pigments can be also used in the polymer composition comprising a thermoplastic polymer and at least two plasticizers (at least one first plasticizer and at least one second plasticizer) as described herein. The level of pigments in the compositions to be used according to the present invention is typically not more than 10 phr, preferably in the range from 0.01 to 5 phr and more preferably in the range from 0.1 to 3 phr. Examples of useful inorganic pigments are $TiO_2$, CdS, $CoO/Al_2O_3$, and $Cr_2O_3$. Examples of useful organic pigments are, for example, azo dyes, phthalocyanine pigments, dioxazine pigments and also aniline pigments.

The polymer composition comprising a thermoplastic polymer and plasticizer (at least one first plasticizer and an optional second plasticizer) as described herein may contain one or more filler, including mineral and/or synthetic and/or natural, organic and/or inorganic materials, for example, calcium oxide, magnesium oxide, calcium carbonate, barium sulphate, silicon dioxide, phyllosilicate, carbon black, bitumen, wood (e.g. pulverized, as pellets, micropellets, fibers, etc.), paper, natural and/or synthetic fibers, glass, etc.

The compositions described herein can be produced in various ways. In general, however, the composition is produced by intensively mixing all components in a suitable mixing container at elevated temperatures. The plastic pellet or powder (typically suspension PVC, microsuspension PVC or emulsion PVC) is typically mixed mechanically, i.e. for example in fluid mixers, turbomixers, trough mixers or belt screw mixers with the plasticizers and the other components at temperatures in the range from 60° C. to 140° C., preferably in the range from 80° C. to 110° C. The components may be added simultaneously or, preferably, in succession (see also E. J. Wickson "Handbook of PVC Formulating", John Wiley and Sons, 1993, pp. 747 ff). The blend of PVC, plasticizer and other additive as described above (e.g. the PVC compound or the PVC paste) is subsequently sent to the appropriate thermoplastic molding processes for producing the finished or semi-finished article, optionally a pelletizing step is interposed.

The blends (e.g. the PVC compound or the PVC paste) are particularly useful for production of garden hoses, pipes, and medical tubing, vinyl gloves, floor coverings, flooring tiles, films, sheeting, roofing, or roofing webs, pool liners, building protection foils, upholstery, and cable sheathing and wire insulation, particularly wire and cable coating, coated textiles and wall coverings.

The plasticizer combinations of the invention are useful across the range of plasticized polyvinyl chloride materials. The plasticizers of the invention are useful in the production of semi-rigid polyvinyl chloride compositions which typically contain from 10 to 40 phr, preferably 15 to 35 phr, more preferably 20 to 30 phr of plasticizers (phr=parts per hundred parts PVC); flexible polyvinyl chloride compositions which typically contain from 40 to 60 phr, preferably 44 to 56 phr, more preferably from 48 to 52 phr plasticizers; and highly flexible compositions which typically contain from 70 to 110 phr, preferably 80 to 100 phr, more preferably 90 to 100 phr of plasticizers.

One widespread use of polyvinyl chloride is as a plastisol. A plastisol is a fluid or a paste consisting of a mixture of polyvinyl chloride and a plasticizer optionally containing various additives, such as those described above. A plastisol is used to produce layers of polyvinyl chloride which are then fused to produce coherent articles of flexible polyvinyl chloride. Plastisols are useful in the production of flooring, tents, tarpaulins, coated fabrics such as automobile upholstery, in car underbody coatings, in moldings and other consumer products. Plastisols are also used in footwear, fabric coating, toys, flooring products and wallpaper. Plastisols typically contain 40 to 200 phr, more typically 50 to 150 phr, more typically 70 to 120 phr, more typically 90 to 110 phr of plasticizers.

In a preferred embodiment of the invention, the plasticizers (at least one first plasticizer of glycol ether based-cyclohexanoate ester(s) and an optional second plasticizer) as described herein is combined with a polymer such as PVC to form a PVC compound (typically made from suspension PVC) or a PVC paste (typically made from an emulsion PVC). A particularly useful PVC in the PVC compound or paste is one having a K value of 65 or more, preferably from 65 to 95, preferably from 70 to 90, preferably from 70-85, alternately the PVC has a K value above 70 (K value is determined according to ISO 1628-2). Particularly preferred PVC compounds or paste comprise: 20 to 200 phr, (alternately 20 to 100 phr) plasticizers and/or 0.5 to 15 phr stabilizer(s), and/or 1 to 100 phr (alternately 1 to 30 phr), preferably 15 to 90 phr (alternately 15 to 30 phr) filler(s), even more preferably the filler is calcium carbonate and the stabilizer is a calcium/zinc stabilizer. The above combination is useful in wire and cable coatings, particularly automobile wire and cable coating and/or building wire insulation.

In general, a particularly good (i.e. low) glass transition temperature is achievable for the polymer compositions of the present invention by using plasticizers which itself have a low glass transition temperature and/or by using a high plasticizer content. Polymer compositions of the present invention may have glass transition temperatures in the range from −70° C. to +10° C., preferably in the range from −60° C. to −5° C., more preferably in the range from −50° C. to −20° C. and most preferably in the range from −45° C. to −30° C.

Unless otherwise indicated, glass transitions (Tg) are midpoints of the second heats obtained by Differential Scanning calorimetry (DSC) using a TA Instruments Q100 calorimeter fitted with a cooling accessory. Typically, 6 to 10 mg of the sample are sealed in an aluminum pan and loaded into the instrument at room temperature. Melting data (first heat) is acquired by heating the sample to at least 30° C. above its melting temperature at a heating rate of 10° C./min. The sample is held for at least 5 minutes at this temperature to destroy its thermal history. Crystallization data are acquired by cooling the sample from the melt to at least 50° C. below the crystallization temperature, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures reported are the peak melting temperatures from the second heat unless otherwise specified. For purposes of this invention and the claims thereto, Tg is determined by DSC, unless otherwise indicated.

This invention further relates to:

1. A polymer composition comprising: 1) a thermoplastic polymer, 2) a first plasticizer of glycol ether based-cyclohexanoate ester(s), preferably represented by the formula:

wherein each $R_1$ is, independently, $C_1$ to $C_{12}$ linear or branched alkyl; each $R_2$ is, independently, H or $CH_3$; each n is, independently, 1, 2, 3 or 4, and when n=4, $R_1$ is $C_2$ to $C_{12}$ linear or branched alkyl; and 3) an optional second plasticizer selected from the group consisting of: alkyl terephthalate, alkyl phthalate, alkyl benzoate ester, di-benzoate ester, ester of cyclohexane polycarboxylic acid, dialkyl adipate, compound(s) of the formula:

wherein R*₁ is a saturated or unsaturated cyclic hydrocarbon optionally substituted with an alkyl and/or an OXO-ester, and R*₂ is a $C_4$ to $C_{20}$ hydrocarbyl; or a mixture thereof 2. The polymer composition of paragraph 1, wherein the second plasticizer compound(s) comprises at least two compounds from the group consisting of alkyl terephthalates, alkyl phthalates, alkyl benzoate esters, di-benzoate esters, esters of cyclohexane polycarboxylic acids, and dialkyl adipates.
3. The polymer composition of paragraph 1, wherein the second plasticizer compound(s) comprises C4 to C12 alkyl terephthalates, C4 to C40 alkyl phthalates, C4 to C40 alkyl isophthalates, C7 to C13 alkyl benzoate esters, C4 to C13 dialkyl adipates, or combinations thereof.
4. The polymer composition of paragraph 1 wherein the second plasticizer comprises a compound of the formula:

wherein R*₁ is a saturated and unsaturated cyclic hydrocarbon optionally substituted with an alkyl and/or an OXO-ester, and R*₂ is a $C_4$ to $C_{20}$ hydrocarbyl.
5. The polymer composition of any of paragraphs 1 to 4, wherein the thermoplastic polymer is selected from the group consisting of vinyl chloride resins, polyesters, polyurethanes, ethylene-vinyl acetate copolymer, rubbers, poly(meth)acrylics and combinations thereof
6. The polymer composition of any of paragraphs 1 to 4, wherein the thermoplastic polymer is polyvinyl chloride.
7. The polymer composition of any of paragraphs 1 to 6, wherein the thermoplastic polymer is present at 99 to 40 wt % and the plasticizers are present at 1 to 60 wt %.
8. The polymer composition of any of paragraphs 1 to 4, wherein the thermoplastic polymer is a PVC suspension, a PVC microsuspension, a PVC emulsion, or a combination thereof
9. The polymer composition of any of paragraphs 1-8, further comprising: an additive selected from the group consisting of a filler, a pigment, a matting agent, a heat stabilizer, an antioxidant, a UV stabilizer, a flame retardant, a viscosity regulator, a solvent, a deaerating agent, an adhesion promoter, a process aid, and a lubricant.
10. A floor covering comprising, wallpaper, tarpaulin, coated textile, wall covering comprising the composition of any of paragraphs 1 to 9.
11. A film comprising the polymer composition of any of paragraphs 1 to 9 wherein the film is a roofing sheet, a tarpaulin, an advertising banner, synthetic leather, packaging film, a medical article, a toy, a seal, or an automobile interior article.
12. The mixture of any of paragraphs 1 to 11, wherein the second plasticizer comprises one or more compounds represented by the formula:

wherein $R_2$ preferably is $C_7H_{15}$, $C_9H_{19}$, $C_{10}H_{21}$, $C_{11}H_{23}$ or $C_{13}H_{27}$.

13. The mixture of any of paragraphs 1 to 12, wherein the first plasticizer of glycol ether based-cyclohexanoate ester(s) is represented by the formula:

wherein each $R_1$ is, independently, $C_1$ to $C_{12}$ linear or branched alkyl; each $R_2$ is, independently, H or $CH_3$; each n is, independently, 1, 2, 3 or 4, and when n=4, $R_1$ is $C_2$ to $C_{12}$ linear or branched alkyl.

14. The mixture of any of paragraphs 1 to 12, wherein the first plasticizer of glycol ether based-cyclohexanoate ester(s) is one or more of:
di(ethylene glycol)monohexyl cyclohexane-1,2-dicarboxylate,
tri(ethylene glycol)monomethyl cyclohexane-1,2-dicarboxylate,
tri(propylene glycol)monomethyl cyclohexane-1,2-dicarboxylate,
tri(ethylene glycol)monoethyl cyclohexane-1,2-dicarboxylate,
tri(ethylene glycol)monobutyl cyclohexane-1,2-dicarboxylate,
di(ethylene glycol)monoethyl cyclohexane-1,2-dicarboxylate,
di(ethylene glycol)monobutyl cyclohexane-1,2-dicarboxylate,
tri(propylene glycol)monopropyl cyclohexane-1,2-dicarboxylate,
tri(propylene glycol)monobutyl cyclohexane-1,2-dicarboxylate,
poly(ethylene glycol)(4) dodecyl cyclohexane-1,2-dicarboxylate,
ethylene glycol mono-2-ethylhexyl cyclohexane-1,2-dicarboxylate,
tetra(ethylene glycol) mono methyl cyclohexane-1,2-dicarboxylate,
di(ethylene glycol) hexadecyl cyclohexane-1,2-dicarboxylate, di(ethylene glycol) octadecyl cyclohexane-1,2-dicarboxylate,
propylene glycol butyl cyclohexane-1,2-dicarboxylate, and di(propylene glycol) methyl cyclohexane-1,2-dicarboxylate.

EXAMPLES

Unless otherwise indicated, room temperature is about 21° C.
Differential Scanning Calorimetry (DSC)

Glass transition in glycol ether based cyclohexanoate fluid/PVC blends and PVC were measured using Differential Scanning calorimetry (DSC). These analyses were conducted using either a TA Instrument's MDSC 2920 or a Perkin Elmer 7 Series Thermal Analysis System. Typically, 6 to 10 mg of neat polymer or plasticized polymer was sealed in an aluminum pan and loaded into the instrument at room temperature. Phase transitions were measured on first heating and second heating from −130° C. to 150° C. at a heating rate of 10° C./min. First heating provides information on the glass transition and feeble melting under as-molded conditions, which can be influenced by thermal history as well as any molded-in orientation or stresses and the second heating gives the transition data under known thermal history conditions.

Kinematic Viscosity is measured according to ASTM D 445 at 40° C. ($Kv_{40}$) or 100° C. ($Kv_{100}$).

Viscosity Index (VI) is measured according to ASTM D 2270.

Pour Point is measured according to ASTM D 97.

Example 1

Synthesis of di(ethylene glycol)mono hexyl ether of cyclohexane-1,2-dicarboxylate 1,2-cyclohexanedicarbocylic anhydride (50 g, 0.324 mol), di(ethylene glycol) mono hexyl ether (135 g 0.713 mol) and titanium tetra-iso propyl (1.47 g, 0.0052 mol) were mixed in 500 ml round bottom flask along with 170 ml xylene. Then solution was refluxed for 18 h with water condenser and dean-stark trap. In 18 hours, 11 ml water was collected in the trap. Xylene was removed by simple distillation at 150° C. and excess of di(ethylene glycol) mono hexyl ether was distilled with air bath oven at 185° C. under high vacuum. The product yield was 149 g (89%). The fluid was found to be completely amorphous (showing no melting peak) having a Tg at −86.45° C.

Example 2

Synthesis of tri(ethylene glycol)monomethyl ether of cyclohexane-1,2-dicarboxylate 1,2-cyclohexanedicarboxylic anhydride (40 g, 0.260 mol), tri(ethylene glycol)monomethyl ether (94 g 0.572 mol) and titanium tetra-iso propyl (1.2 g, 0.0042 mol) were mixed in 500 ml round bottom flask along with 200 ml xylene. Then solution was refluxed for 18 h with water condenser and dean-stark trap. In 18 hours, 5 ml water was collected in the trap. Xylene was removed by simple distillation at 150° C. and excess of tri(ethylene glycol)monomethyl ether was removed by air bath oven at 185° C. under high vacuum. The product yield was 83 g. The fluid of the example 2 had kinematic viscosity ($Kv_{100}$) of 4.71 cSt at 100° C., kinematic viscosity ($Kv_{40}$) of 24.3 cSt at 40° C., and viscosity index of 101. The fluid had a pour point of −54° C.

Example 3

Evaluation as PVC Plasticizer

To demonstrate the effect of plasticization, a film of plasticized polymer was prepared as follows: 10 g PVC polymer (Aldrich, Mw 233,000 g/mol) was dissolved in 150 ml THF and the solution was stirred at room temperature for 24 hours to obtain a stock solution. Then the PVC solution was mixed with 20 wt % fluid of Example 2, poured into aluminum pan, and the solvent was allowed to evaporate under nitrogen. A control film was prepared without the fluid of Example 2. After 12 hours, the films were peeled away from the aluminum pan container. The films were dried in a vacuum oven at 50° C. for 12 hours. The films were clear and flexible suggesting that tri(ethylene glycol)monomethyl ether of cyclohexane-1,2-dicarboxylate is a good PVC plasticizer.

Figure 1:
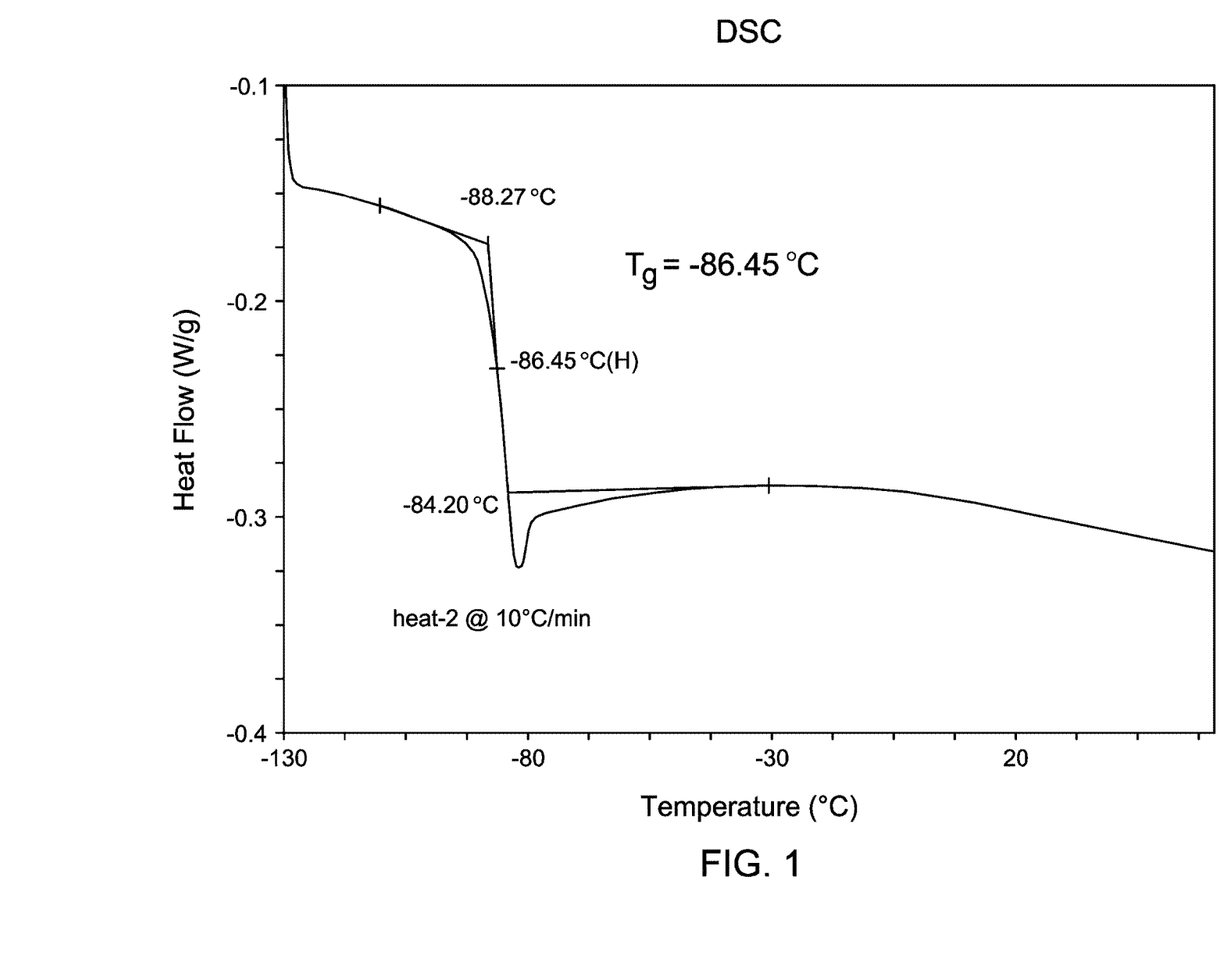
FIG. 1 is a DSC trace for the di(ethylene glycol) mono hexyl ether of cyclohexane-1,2-dicarboxylate of Example 1.
Figure 2:
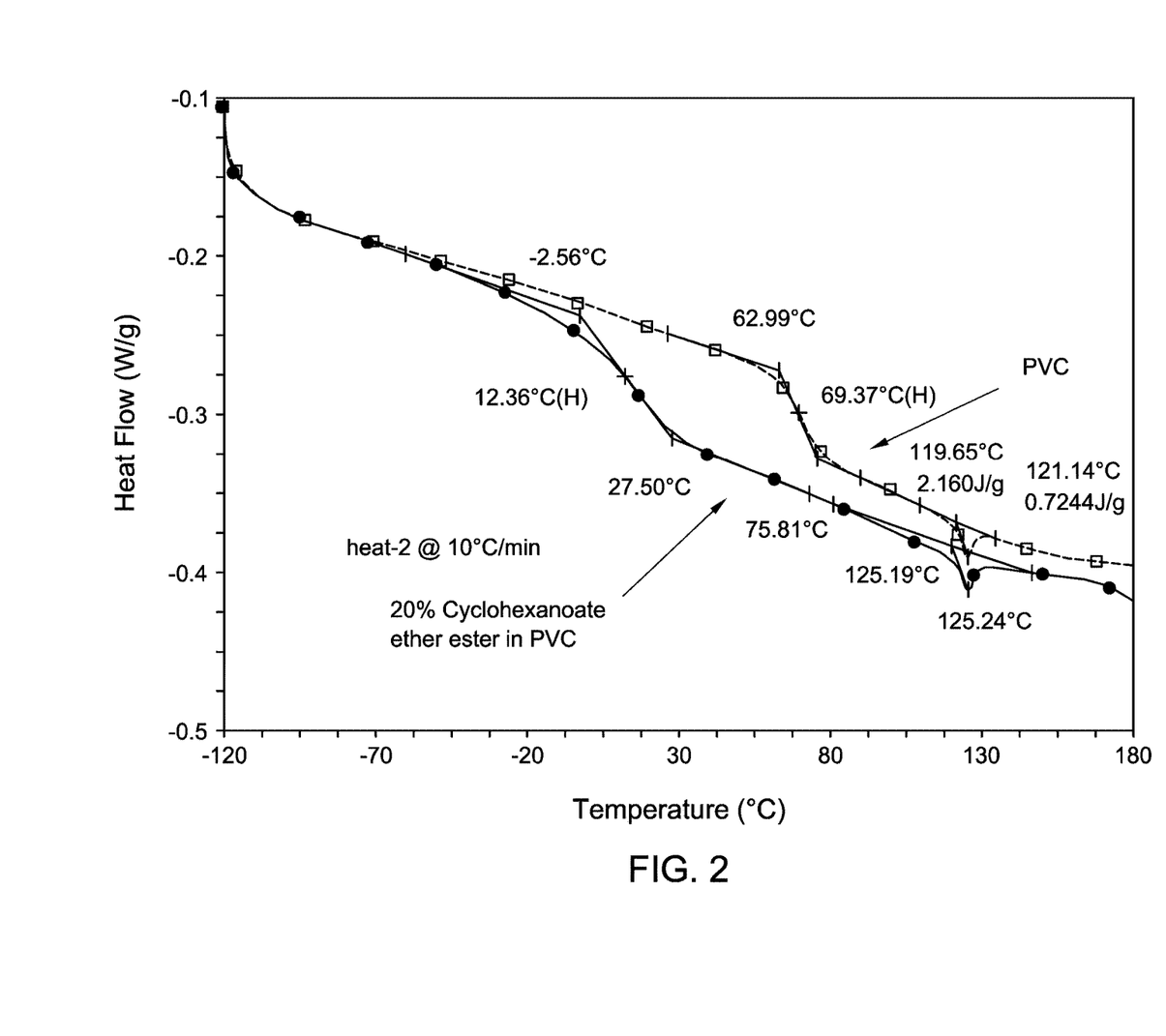
FIG. 2 is a DSC trace of the tri(ethylene glycol) mono methyl ether of cyclohexane-1,2-dicarboxylate of Example 2 and the film of PVC and 20 wt % tri(ethylene glycol) mono methyl ether of cyclohexane-1,2-dicarboxylate.

The primary role of plasticizers is to improve the flexibility and processability of polymers by lowering the glass transition temperature (Tg). Plasticizers are low molecular weight (MW) liquids, which form secondary bonds to polymer chains and spread them apart. Thus, plasticizers reduce polymer-polymer chain secondary bonding and provide more mobility for the macromolecules, resulting in a softer, more easily deformable mass. The films from Example 3 were tested by DSC and the data are shown in FIG. 2. The glass transition temperature (Tg) of the polymer decreased from 69.37° C. to 12.36° C. using 20 wt % plasticizer of the Example 2 (FIG. 2).

Example 4

The following reaction was conducted:

and the material produced had a $Kv_{100}$ of 3.62 cSt, $Kv_{40}$ of 15.4 cSt, VI of 120. These fluids can each be blended with PVC (such as at 20 wt %) to form a plasticized PVC.

All patents and patent applications (including priority documents), test procedures (such as ASTM methods), and other documents cited herein are fully incorporated by reference to the extent such disclosure is not inconsistent with this disclosure and for all jurisdictions in which such incorporation is permitted. Also, when numerical lower limits and numerical upper limits are listed herein, ranges from any lower limit to any upper limit are contemplated.

The disclosure has been described above with reference to numerous embodiments and specific examples. Many variations will suggest themselves to those skilled in this art in light of the above detailed description. All such obvious variations are within the full intended scope of the appended claims.

What is claimed is:

1. A composition comprising a thermoplastic polymer and a first plasticizer compound of the formula:

wherein each $R_1$ is, independently, $C_1$ to $C_{12}$ linear or branched alkyl; each $R_2$ is, independently, H or $CH_3$; each n is, independently, 1, 2, 3 or 4, and when n=4, $R_1$ is $C_2$ to $C_{12}$ linear or branched alkyl,
wherein the composition further comprises a second plasticizer comprising a compound of the formula:

wherein $R^*_1$ is a saturated or unsaturated cyclic hydrocarbon substituted with an alkyl and/or an OXO-ester, and $R^*_2$ is a $C_4$ to $C_{20}$ hydrocarbyl, and wherein the second plasticizer compound comprises at least two cyclic moieties directly bonded to each other.

2. The composition of claim 1, wherein each $R_1$ is independently, $C_2$ to $C_6$ alkyl.

3. The composition of claim 1, wherein each $R_1$ is independently, $C_1$ to $C_6$ alkyl, $R_2$ is H, and n is 2 or 3.

4. The composition of claim 1, wherein $R_1$ is $C_1$ to $C_6$ alkyl, $R_2$ is $CH_3$, and n is 2 or 3.

5. The composition of claim 1, wherein $R_1$ is $C_2$ to $C_{12}$ alkyl, $R_2$ is H, and n is 4.

6. The composition of claim 1, where the first plasticizer compound is represented by one or more of the following formulae:

-continued

7. The composition of claim 1, wherein the thermoplastic polymer comprises at least one of vinyl chloride resins, polyesters, polyurethanes, ethylene-vinyl acetate copolymer, rubbers, poly(meth)acrylics and combinations thereof.

8. The composition of claim 1, wherein the thermoplastic polymer is polyvinyl chloride.

9. The composition of claim 1, wherein the thermoplastic polymer is present at 99 to 40 wt % and the first plasticizer is present at 1 to 60 wt %.

10. The composition of claim 1, wherein the thermoplastic polymer is a PVC suspension, a PVC microsuspension, a PVC emulsion, or a combination thereof.

11. The polymer composition of claim 1, further comprising: an additive of at least one of a filler, a pigment, a matting agent, a heat stabilizer, an antioxidant, a UV stabilizer, a flame retardant, a viscosity regulator, a solvent, a deaerating agent, an adhesion promoter, a process aid, and a lubricant.

12. A floor covering, wallpaper, tarpaulin, coated textile, wall covering comprising the composition of claim 1.

13. A film comprising the composition of claim 1 wherein the film is a roofing sheet, a tarpaulin, a banner, synthetic leather, packaging film, a medical article, a toy, a seal, or an automobile interior article.

14. The composition of claim 1, wherein the first plasticizer is one or more of:
di(ethylene glycol)monohexyl cyclohexane-1,2-dicarboxylate,
tri(ethylene glycol)monomethyl cyclohexane-1,2-dicarboxylate,
tri(propylene glycol)monomethyl cyclohexane-1,2-dicarboxylate,
tri(ethylene glycol)monoethyl cyclohexane-1,2-dicarboxylate,
tri(ethylene glycol)monobutyl cyclohexane-1,2-dicarboxylate,
di(ethylene glycol)monoethyl cyclohexane-1,2-dicarboxylate,
di(ethylene glycol)monobutyl cyclohexane-1,2-dicarboxylate,
tri(propylene glycol)monopropyl cyclohexane-1,2-dicarboxylate,
tri(propylene glycol)monobutyl cyclohexane-1,2-dicarboxylate,
poly(ethylene glycol)(4)dodecyl cyclohexane-1,2-dicarboxylate,
ethylene glycol mono-2-ethylhexyl cyclohexane-1,2-dicarboxylate,
tetra(ethylene glycol) mono methyl cyclohexane-1,2-dicarboxylate,
di(ethylene glycol)hexadecyl cyclohexane-1,2-dicarboxylate,
di(ethylene glycol)octadecyl cyclohexane-1,2-dicarboxylate,
propylene glycol butyl cyclohexane-1,2-dicarboxylate, and
di(propylene glycol)methyl cyclohexane-1,2-dicarboxylate.

* * * * *